(12) United States Patent
Lavoie et al.

(10) Patent No.: US 10,013,366 B2
(45) Date of Patent: Jul. 3, 2018

(54) STANDARDIZED HOT-PLUGGABLE TRANSCEIVING UNIT AND METHOD FOR CONTROLLING THE UNIT THROUGH A WEB SERVER FUNCTION

(71) Applicant: Embrionix Design Inc., Laval (CA)

(72) Inventors: Renaud Lavoie, Laval (CA); Eric Dudemaine, Crabtree (CA)

(73) Assignee: EMBRIONIX DESIGN INC., Laval (CA)

( * ) Notice: Subject to any disclaimer, the term of this patent is extended or adjusted under 35 U.S.C. 154(b) by 220 days.

(21) Appl. No.: 14/859,475

(22) Filed: Sep. 21, 2015

(65) Prior Publication Data

US 2016/0085697 A1    Mar. 24, 2016

Related U.S. Application Data

(60) Provisional application No. 62/053,415, filed on Sep. 22, 2014.

(51) Int. Cl.
| | |
|---|---|
| *G06F 13/10* | (2006.01) |
| *G06F 13/40* | (2006.01) |
| *G02B 6/42* | (2006.01) |
| *H01R 13/66* | (2006.01) |
| *H04L 29/08* | (2006.01) |

(52) U.S. Cl.
CPC ......... *G06F 13/102* (2013.01); *G02B 6/4278* (2013.01); *G06F 13/4081* (2013.01); *H01R 13/665* (2013.01); *H04L 67/02* (2013.01); *H04L 67/34* (2013.01)

(58) Field of Classification Search
CPC .. G06F 13/102; G06F 13/4081; G02B 6/4278
USPC ........................................................ 710/316
See application file for complete search history.

(56) References Cited

U.S. PATENT DOCUMENTS

| | | | | |
|---|---|---|---|---|
| 8,041,840 | B2* | 10/2011 | Batke ..................... | G05B 19/05 700/83 |
| 2004/0177163 | A1* | 9/2004 | Casey ................. | G06F 19/3418 709/249 |
| 2005/0198339 | A1* | 9/2005 | Amrhein .............. | G05B 19/042 709/230 |
| 2007/0223470 | A1* | 9/2007 | Stahl ...................... | H04L 41/00 370/389 |

(Continued)

Primary Examiner — Christopher Shin
(74) Attorney, Agent, or Firm — IP Delta Plus Inc.

(57) ABSTRACT

The present disclosure relates to a standardized hot-pluggable transceiving unit executing a web server function for controlling the transceiving unit, and a method and computer program product for controlling the transceiving unit through the web server function. The method comprises executing by a control unit in the housing of the transceiving unit a web server function, receiving via a communication interface of the transceiving unit a control command, processing the control command by the web server function, and configuring a component of the transceiving unit based on the processing of the control command. The configured component may be the control unit or a signal processing unit. The method may further comprise generating a diagnostic message by the web server function, which is transmitted to a control device via the communication interface. The diagnostic message may comprise a diagnostic of the control unit or the signal processing unit.

19 Claims, 10 Drawing Sheets

(56) References Cited

U.S. PATENT DOCUMENTS

| | | | | |
|---|---|---|---|---|
| 2010/0262863 A1* | 10/2010 | Hess | ............. | G06F 11/0748 714/32 |
| 2011/0182588 A1* | 7/2011 | Wojtowicz | ............. | H04B 10/40 398/139 |
| 2011/0191632 A1* | 8/2011 | Miller | ............. | G06F 11/28 714/27 |
| 2011/0216779 A1* | 9/2011 | Peterson | ............. | H04L 12/56 370/401 |
| 2012/0182900 A1* | 7/2012 | Davari | ............. | H04L 12/10 370/254 |
| 2012/0301134 A1* | 11/2012 | Davari | ............. | H04L 41/5038 398/9 |
| 2014/0024255 A1* | 1/2014 | Robitaille | ............. | H04B 10/40 439/607.2 |
| 2016/0035156 A1* | 2/2016 | Andrus | ............. | G07C 5/0808 701/34.4 |
| 2016/0072602 A1* | 3/2016 | Earl | ............. | H04J 3/0697 709/248 |
| 2017/0116795 A1* | 4/2017 | Andrus | ............. | G07C 5/0808 |

\* cited by examiner

STANDARDIZED HOT-PLUGGABLE TRANSCEIVING UNIT AND METHOD FOR CONTROLLING THE UNIT THROUGH A WEB SERVER FUNCTION

TECHNICAL FIELD

The present disclosure relates to the field of standardized hot-pluggable transceiving units. More specifically, the present disclosure relates to a standardized hot-pluggable transceiving unit executing a web server function for controlling the transceiving unit, and a method and computer program product for controlling the transceiving unit through the web server function.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form factor Pluggable) Transceiver", dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form Factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a host system, the host system in turn exchanging signals with external apparatuses via SFP devices.

Recently, SFP units with internal features and functions providing signal processing capabilities have appeared. For instance, some SFP units, such as the Emsfp™ now include signal re-clocking, signal reshaping or reconditioning, signals combination or separation, etc. However, such SFP units lack the capability to easily adapt and configure their internal features and functions by means of a standardized management functionality that could be supported by a plurality of SFP units having a variety of internal features and functions. More generally, standardized hot-pluggable transceiving units lack this capability to easily adapt and configure their internal features and functions.

Therefore, there is a need for a standardized hot-pluggable transceiving unit executing a web server function for controlling the transceiving unit, and a method and computer program product for controlling the transceiving unit through the web server function.

SUMMARY

According to a first aspect, the present disclosure provides a standardized hot-pluggable transceiving unit comprising a housing, a communication interface and a control unit in the housing. The housing has specific standardized dimensions and is adapted to being inserted into a chassis of a hosting unit. The communication interface receives a control command. The control unit executes a web server function for processing the received control command, and for configuring a component of the transceiving unit based on the processing of the received command.

According to a second aspect, the present disclosure provides a method for controlling a standardized hot-pluggable transceiving unit through a web server function. The method comprises executing, by a control unit in the housing of the transceiving unit, the web server function. The method comprises receiving, via a communication interface of the transceiving unit, a control command. The method further comprises processing the received control command by the web server function, and configuring a component of the transceiving unit based on the processing of the received command.

According to a third aspect, the present disclosure provides a computer program product comprising instructions deliverable via an electronically-readable media, such as storage media and communication links. The instructions comprised in the computer program product, when executed by a processor of a control unit of a standardized hot-pluggable transceiving unit, provide for controlling the transceiving unit through a web server function according to the aforementioned method.

BRIEF DESCRIPTION OF THE DRAWINGS

Embodiments of the disclosure will be described by way of example only with reference to the accompanying drawings, in which.

DETAILED DESCRIPTION

Figure 1:
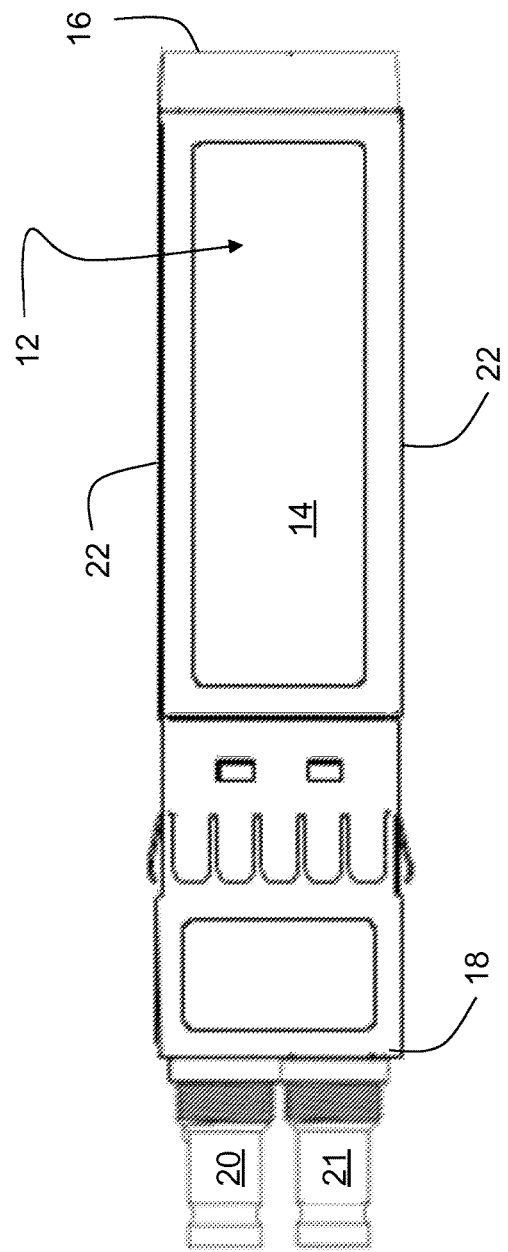
FIG. 1 is a top view of an SFP unit.
Figure 2:
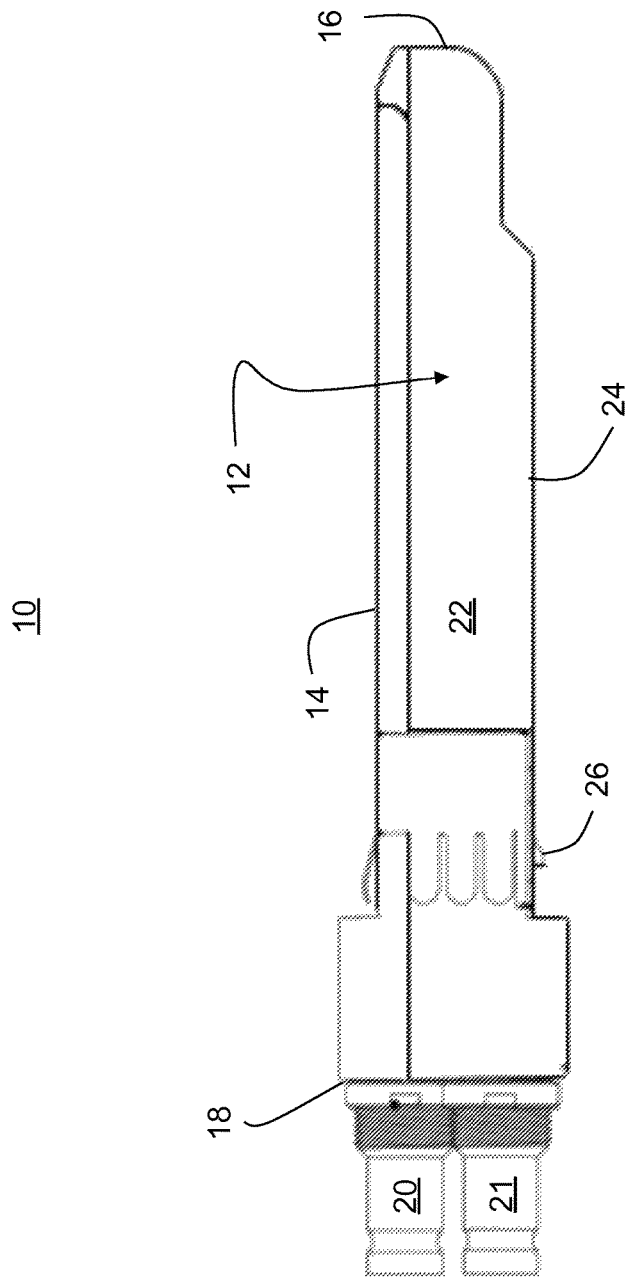
FIG. 2 is a side elevation view of the SFP unit of FIG. 1.
Figure 4:
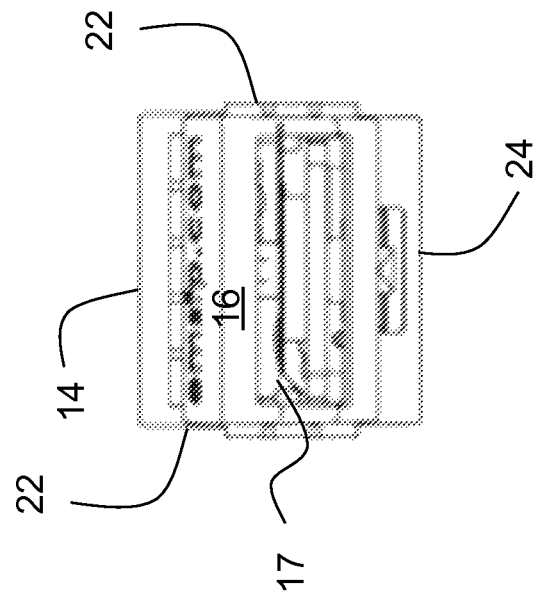
FIG. 4 is back elevation view of the SFP unit of FIG. 1.
Figure 3:
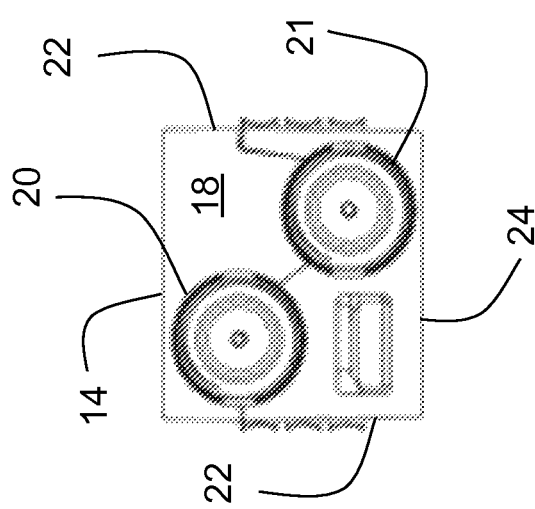
FIG. 3 is a front elevation view of the SFP unit of FIG. 1.
Figure 5:
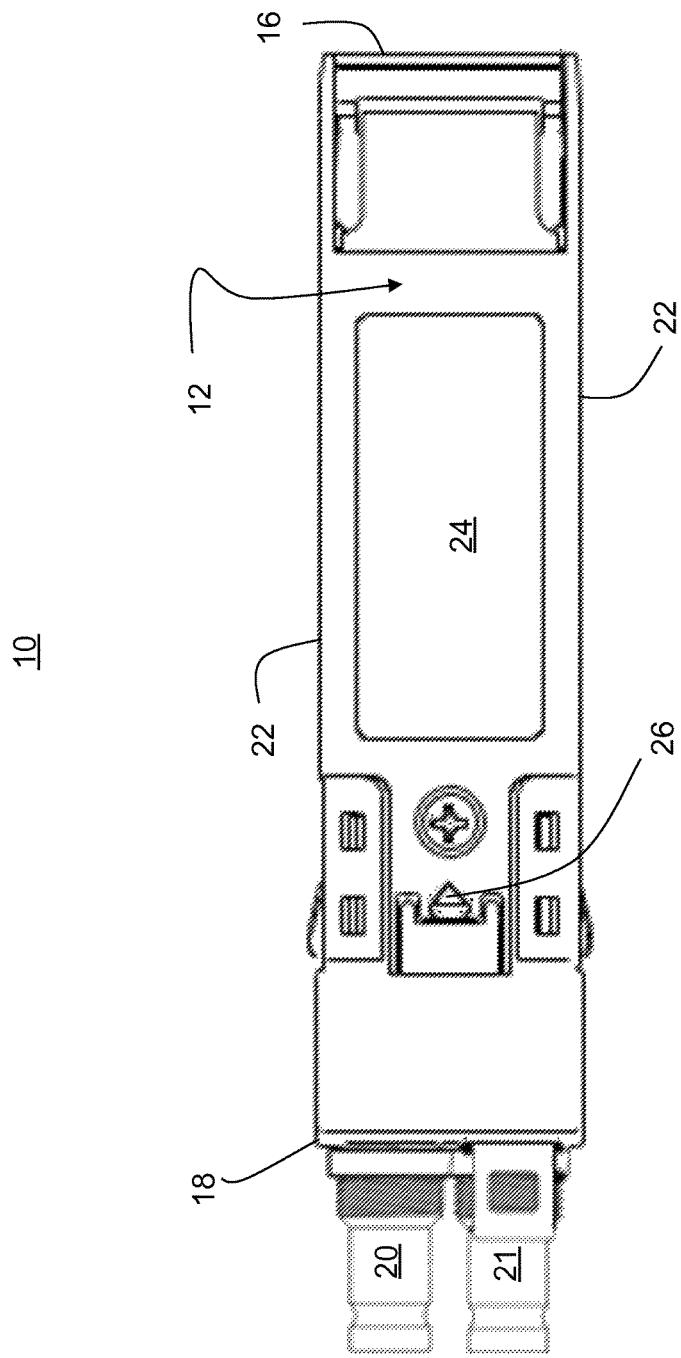
FIG. 5 is a bottom view of the SFP unit of FIG. 1.
Figure 6:
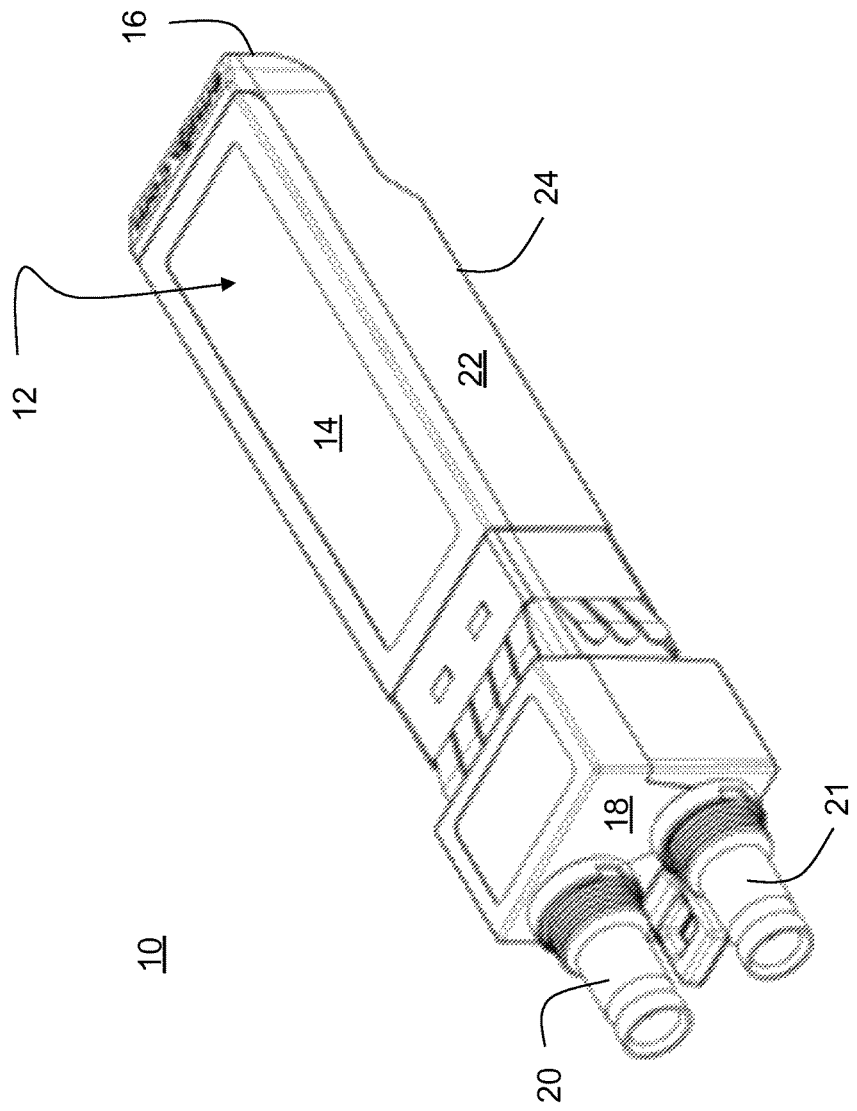
FIG. 6 is a perspective view of the SFP unit of FIG. 1.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the configuration and management of standardized hot-pluggable transceiving units, such as for example Small Form-factor Pluggable (SFP)/SFP+ units, having different kinds of internal components providing internal features and functions to the transceiving units for performing different kinds of signal processing.

The following terminology is used throughout the present disclosure:

SFP: Small Form-factor Pluggable, this term refers to hot-pluggable transceiving units that are insertable into a chassis of a hosting unit, and which complies with an industry standard specification for Small Form-factor Pluggable.

ADC: Analog to Digital Converter for Conversion of an electrical or optical signal.

DAC: Digital to Analog Converter for Conversion of an electrical or optical signal.

Connector: A component for physically joining circuits carrying electrical, optical, radio-frequency, or like signals.

SDTV: Standard-definition television uses a resolution that is not considered to be either high-definition television (HDTV) or enhanced-definition television (EDTV). The two common SDTV signal types are 576i, with 576 interlaced lines of resolution, derived from the European-developed PAL and SECAM systems.

EDTV: Enhanced-definition television defines formats (e.g. 480p) that deliver a picture superior to that of SDTV, but not as detailed as HDTV.

HDTV: High-definition television defines formats (e.g. 720p, 1080i, and 1080p) that provide a resolution that is substantially higher than that of SDTV and EDTV.

In the rest of the disclosure, an SFP unit is used to illustrate an example of a standardized hot-pluggable transceiving unit. However, the teachings of the present disclosure are not limited to an SFP unit, and apply to any type of standardized hot-pluggable transceiving unit. Furthermore, although the present disclosure uses the term SFP unit, as it is Reference is now made concurrently to FIGS. 1-6, which are, respectively, a top view, a side elevation view, a front elevation view, a back elevation view, a bottom view, and a perspective view of an SFP unit 10. The SFP unit 10 comprises a housing 12. The housing defines a top 14, a bottom 24, and two sides 22. The SFP unit 10 (and particularly the housing 12) may be fully or at least partially of dimensions in compliance with at least one of the following standards: SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK, etc. Alternatively, the SFP unit 10 (and particularly the housing 12) has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 may comprise a rear interface 17, for example an electrical or an optical interface. In an example, the back panel comprises the rear interface 17 (also named a host connector) suitable to connect the SFP unit to a backplane of a chassis (not shown for clarity purposes), as known to those skilled in the art.

The SFP unit 10 further comprises a front panel 18 affixed to the housing 12. The front panel 18 may comprise one or more connectors, for example a connector 20 of a co-axial cable type, adapted to send and/or receive an analog or digital signal and a connector 21, also of the co-axial cable type, adapted to send and/or receive a serial data signal. The SFP unit 10 may further comprise an engagement mechanism such as for example a latch 26 as shown in a resting position on the bottom 24 in FIG. 2, for maintaining the SFP unit 10 in place within a chassis. Although not shown, the SFP unit 10 further comprises at least one receiver, at least one transmitter and/or at least one transceiver. The SFP unit 10 may alternately comprise dual receivers and/or dual transmitters. Each connector of the SFP unit 10 is directly connected to a receiver, transmitter, or a transceiver. In alternative embodiments of the SFP unit 10, the front panel 18 may comprise more than two connectors.

Examples of connectors in the context of the present disclosure comprise electric and optic connectors such as: 8P8C connectors, Universal Serial Bus (USB) connectors, Radio Frequency (RF) connectors, Audio connectors, Video connectors, all types of coaxial cable connectors and all types of optic fiber connectors, etc. Some of these connector types are suitable for transmission of analog signals and/or digital signals, as is well-known to those of ordinary skill in the art.

Referring now concurrently to FIGS. 7A, 7B, 8 and 9, an SFP unit 100 executing a web server function 103 for SFP control purposes and a method 300 for controlling the SFP unit 100 through the web server function 103 are represented. The SFP unit 100 corresponds to the SFP unit 10 represented in FIGS. 1-6, and has been adapted to execute the web server function 103. Additional components of the SFP unit 100, such as a control unit 102 and a signal processing unit 108, are internal to the housing 12 shown on the preceding FIGS. 1-6.

The SFP unit 100 comprises the control unit 102. The control unit 102 comprises a processing unit 104, having one or more processors (not represented in FIG. 7B for simplification purposes) capable of executing instructions of a computer program. Each processor may further have one or several cores. Some of the instructions executed by the processing unit 104 execute the web server function 103 for controlling the SFP unit 100. The control unit 102 also comprises memory 105 for storing instructions of the computer program(s) executed by the processing unit 104, data generated by the execution of the computer program(s), etc. The control unit 102 may comprise several types of memories, including volatile memory, non-volatile memory, etc. The control unit 102 further comprises at least one input/output unit 106, for exchanging data (e.g. 312' and 332') with other components of the SFP unit 100 (e.g. with the signal processing unit 108), and for exchanging data (e.g. 312 and 332) with other devices (e.g. a control device 200) via a communication interface (e.g. the rear interlace 17 on the back panel 16) of the SFP unit 100.

In the rest of the description, we refer to instructions of a specific computer program. The instructions of the specific computer program implement the steps of the method 300. The instructions are comprised in a computer program product (e.g. memory 105) and provide for controlling the SFP unit 100 through the web server function 103, when executed by the processing unit 104 of the control unit 102. The instructions of the computer program product are deliverable via an electronically-readable media, such as a storage media (e.g. a USB key) or via communication links (e.g. 312 and 332) through a communication interface (e.g. 17) of the SFP unit 100.

The method 300 comprises the step of executing 305 the web server function 103 by the processing unit 104 of the control unit 102. Executing a web server function is well known in the art. In the context of the present disclosure, it may include hosting one or several web pages describing the present configuration of the SFP unit 100, and allowing modifications of the present configuration via editable fields in the web pages. A control device 200 accesses these web pages by interacting with the web server function 103 via a communication interface (e.g. rear interface 17) of the SFP unit 100.

The control device 200 is used for controlling the SFP unit 100. It comprises a processing unit and memory for processing and/or storing data exchanged with the web server function 103 of the SFP unit 100. It may also comprise a display for displaying data (e.g. the web pages describing the present configuration of the SFP unit 100) received from the web server function 103. The control device 200 also comprises a communication interface for exchanging data with the web server function 103. Examples of computing devices 200 include desktops, laptops, tablets, smartphones, etc. For simplification purposes, the aforementioned components of the control device 200 have not been represented in FIGS. 6A and 8.

The method 300 comprises the step of receiving 310 a control command 312 via a communication interface (e.g. rear interface 17) of the SFP unit 100. For instance, the control device 200 may comprise a user interface (e.g. a keyboard, a mouse, a touchscreen, etc.) for modifying a configuration parameter of the SFP unit 100. The control device 200 displays a web page with one or several configuration parameters of the SFP unit 100 on its display. At least one of the configuration parameters can be modified by a user of the configuration device 200 via its user interface. Upon modification of the configuration parameter(s), the control command 312 comprising the modified configuration parameter(s) is transmitted by the control device 200 to the web server function 103 via communication interface (e.g. 17) of the SFP unit 100.

In order for the web server function 103 to be capable of interpreting the control command 312, the control command 312 needs to be compatible with standard communication protocols used for communicating with a web server. The control command 312 may be compatible with the Internet Protocol (IP), which represents the network layer in a communication protocol stack. A transport protocol is also generally used on top of the IP protocol for communicating with a web server. Thus, the control command 312 may also be compatible with a transport protocol, usually the Transmission Control Protocol (TCP). Alternatively, the User Datagram Protocol (UDP) or another transport protocol above the IP layer may be used for transmitting the control command 312 to the web server function 103. Dedicated applicative protocols such as the Hypertext Transfer Protocol (HTTP) are also generally used (on top of the transport protocol) for communicating with a web server. Thus, the control command 312 may also be compatible with applicative protocols such as HTTP, Hypertext Markup Language (HTML), Extensible Markup Language (XML), JavaScript, .NET, Flash, Universal Plug and Play (UPnP). Alternatively, the Simple Network Management Protocol (SNMP) or another applicative protocol above the transport layer may be used for transmitting the control command 312 to the web server function 103.

In a first alternative, the control device 200 may directly send the control command 312 in the form of an HTTP request with a POST method to the web server function 103, with the new configuration parameter(s) as parameters of the POST method.

In a second alternative, the control device 200 may send an HTTP request with a GET method to the web server function 103 for receiving the current configuration of the SFP unit 100. The web server function 103 transmits the current configuration in the form of an HTTP response comprising the current configuration parameters. A user of the control device 200 visualizes the current configuration parameters and modifies at least one of them. Then, the control device 200 sends the control command 312 in the form of the HTTP request with the POST method comprising the new configuration parameters to the web server function 103. This second alternative is not represented in FIG. 9 for simplification purposes.

The usage of the HTTP request/response and POST/GET methods are for illustration purposes only. As mentioned previously, other application protocols such as JavaScript, UPnP, SNMP, etc. may also be used alternatively or in complement.

Figure 7A:
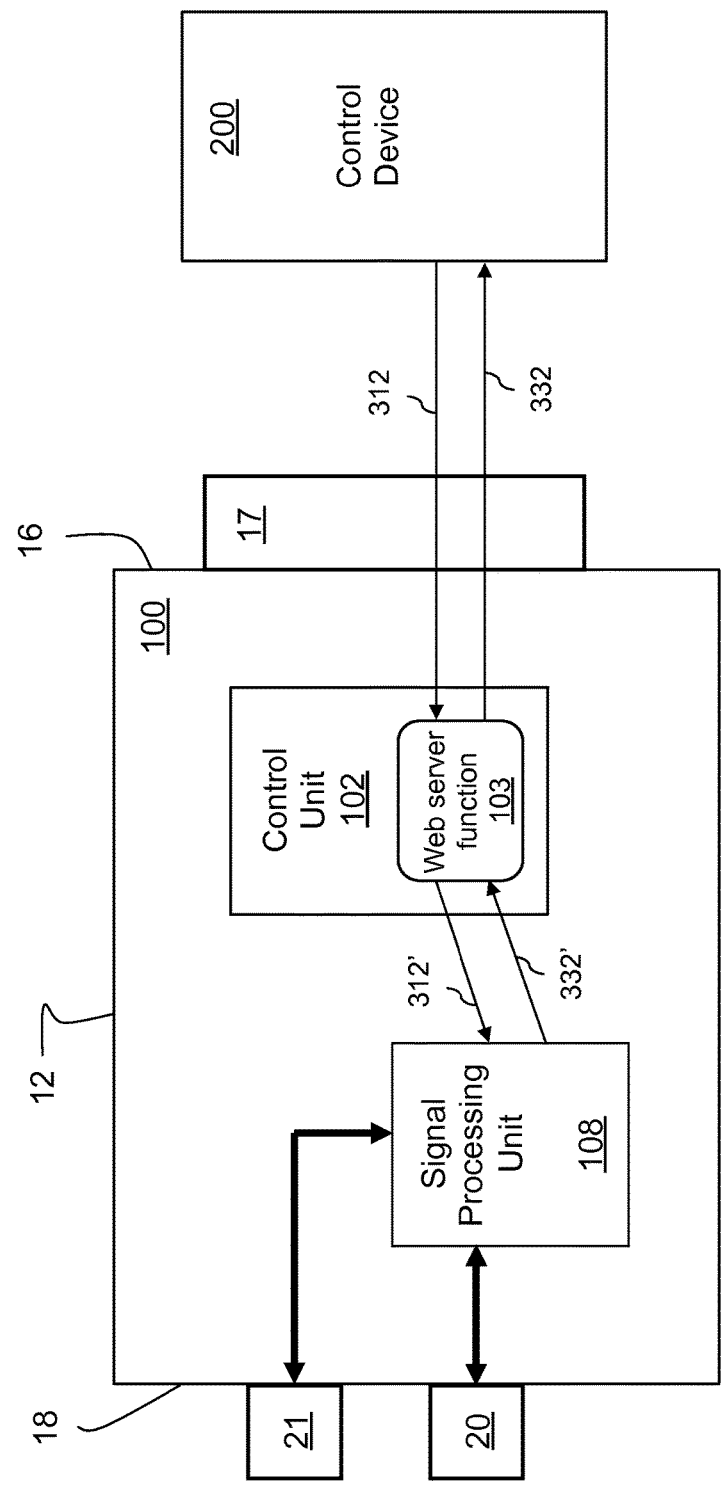
FIG. 7A is a simplified, exemplary block diagram of an SFP unit having a web server function for controlling the SFP unit, according to a first embodiment.
Figure 7B:
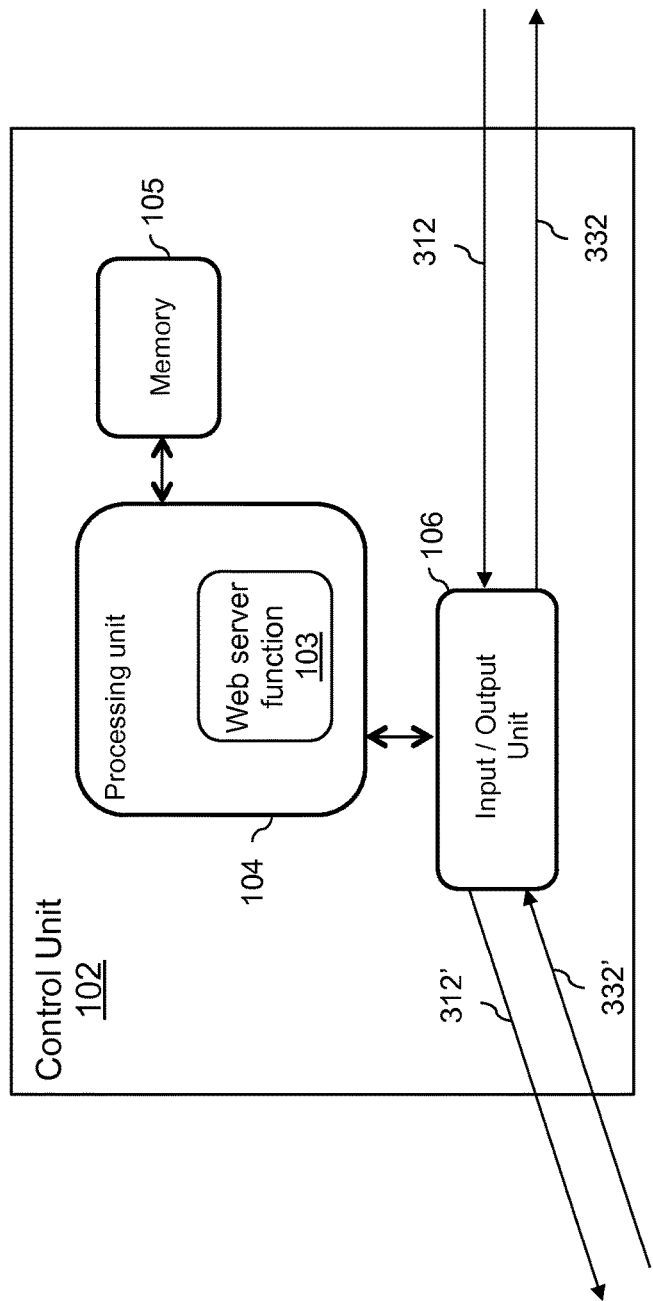
FIG. 7B illustrates a control unit of the SFP unit of FIG. 7A for implementing the web server function.

As mentioned previously, the communication interface of the SFP unit 100 for exchanging data between the web server function 103 and the control device 200 may be the rear interface 17 on the back panel 16 of the housing 12, as illustrated in FIG. 7A. The rear interface 17 is generally an electrical interface and may support the Ethernet protocol, which is one of the commonly used protocol for transporting IP datagrams. The rear interface 17 may be dedicated to the control of the SFP unit 100, or may also be used for transmitting and/or receiving signals processed by a signal processing unit (e.g. 108) of the SFP unit 100.

Alternatively, the communication interface of the SFP unit 100 for exchanging data between the web server function 103 and the control device 200 is a connector (e.g. 20 or 21) on the front panel 18 of the housing 12. The front connector (20 or 21) may be an electrical connector supporting the Ethernet protocol, or an optical connector supporting a physical layer protocol capable of transporting IP datagrams. This front connector (20 or 21) may be dedicated to the control of the SFP unit 100, or may also be used for transmitting and/or receiving signals processed by a signal processing unit (e.g. 108) of the SFP unit 100.

Figure 8:
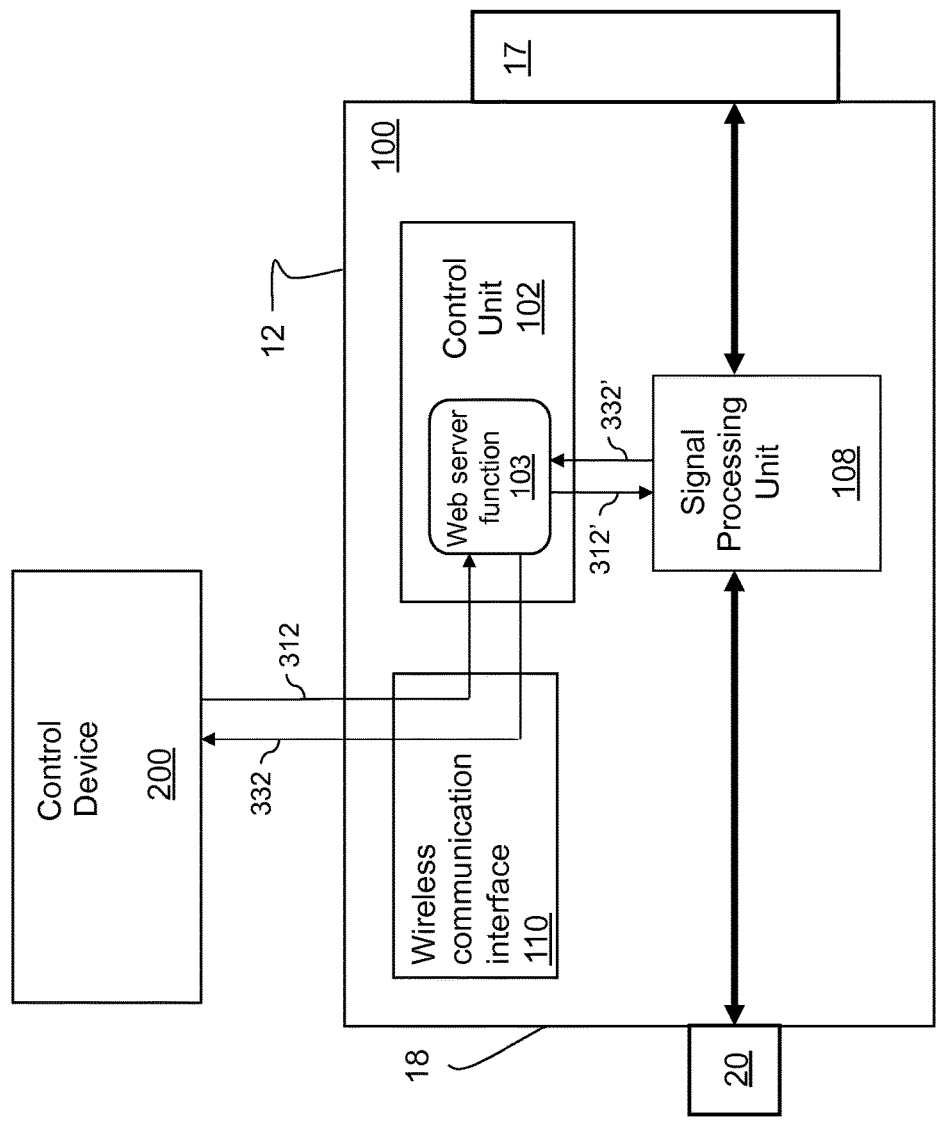
FIG. 8 is a simplified, exemplary block diagram of an SFP unit having a web server function for controlling the SFP unit, according to another embodiment.
Figure 9:
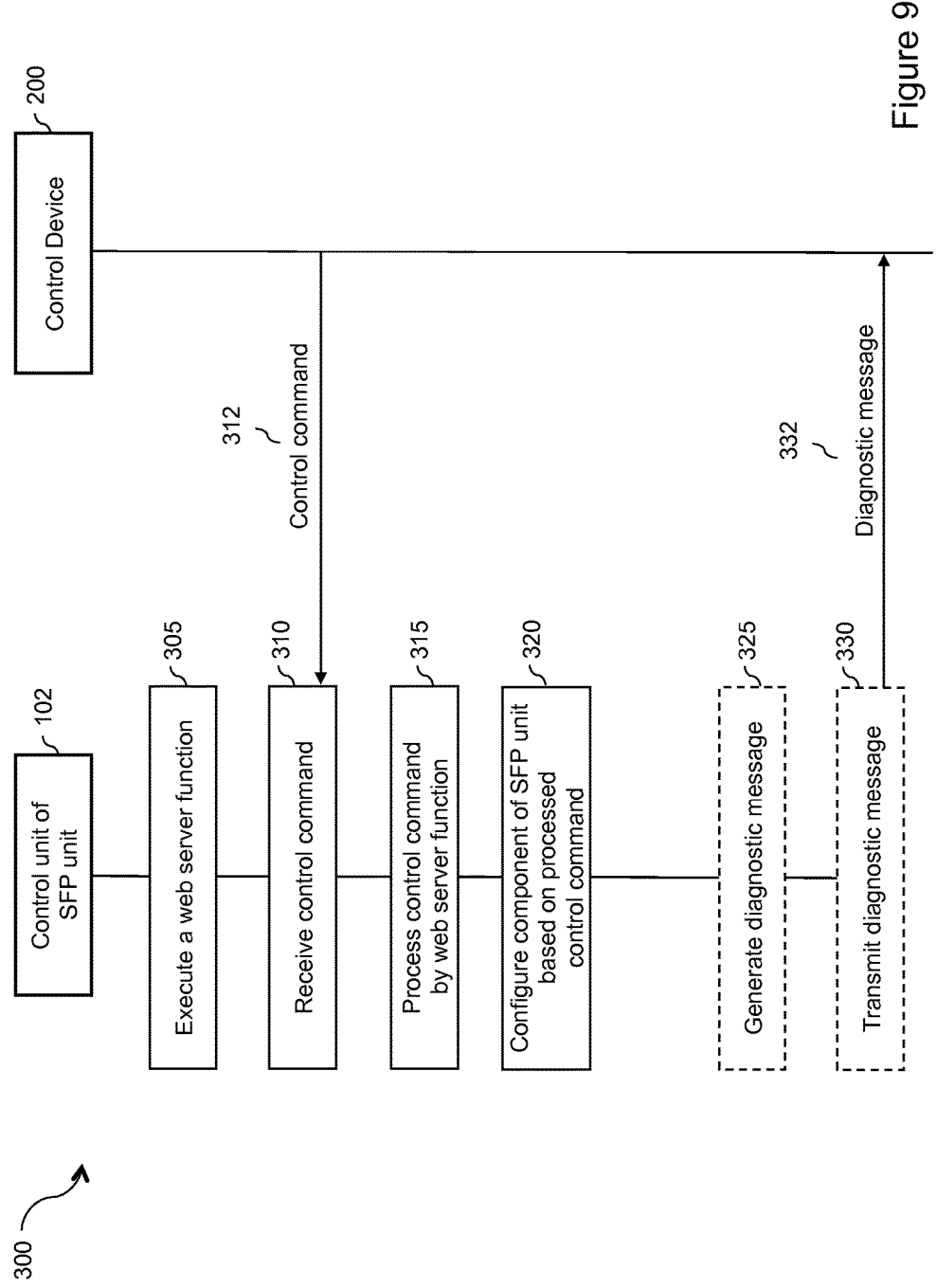
FIG. 9 illustrates a method for controlling the SFP unit of FIGS. 7A and 8 through the web server function.

Alternatively, the communication interface of the SFP unit 100 for exchanging data between the web server function 103 and the control device 200 is a wireless communication interface 110 inside the housing 12, as illustrated in FIG. 8. The wireless communication interface 110 may support the Wi-Fi communication standard, a cellular communication standard such as the Universal Mobile Telecommunications System (UMTS) standard or the Long Term Evolution (LTE) standard, etc. The wireless communication interface 110 is dedicated to the control of the SFP unit 100. The connectors (e.g. 17 and 21) are reserved for transmitting and/or receiving signals processed by a signal processing unit (e.g. 108) of the SFP unit 100. The control device 200 also comprises a wireless communication interface (not represented in FIG. 8) for exchanging data with the web server function 103 via the wireless communication interface 110 for controlling the SFP unit 100.

In a particular aspect, the control unit 102 configures an IP address for the communication interface (e.g. 17 or 20 or 110) of the SFP unit 100 used for exchanging data between the web server function 103 and the control device 200. The control unit 102 executes a software implementing an IP stack for allowing the web server function 103 to operate. The execution of this software includes the configuration of the IP address, which can then be used by the web server function 103 for communicating with other entities, such as the control device 200. The configuration of an IP address for a communication interface of a device is well known in the art, and may be based for example on the Dynamic Host Configuration Protocol (DHCP) protocol. The configured IP address may be an IPv4 or an IPv6 address.

The method 300 further comprises the steps of processing 315 the received control command 312 by the web server function 103 and configuring 320 a component of the SFP unit 100 based on the processing of the received control command 312. Processing 315 the received control command 312 may consist in extracting and processing configuration parameters included in the control command 312, to configure 320 the component of the SFP unit 100 based on the processed configuration parameters. Alternatively or complementarity, processing 315 the received control command 312 consists in generating configuration parameters not included in the control command 312 (e.g. reading configuration parameters corresponding to the control command 312 in a memory of the component, calculating configuration parameters corresponding to the control command 312 by a processing unit of the component), to configure 320 the component of the SFP unit 100 based on the generated configuration parameters. Thus a control command 312 may include an action with associated configuration parameters, or an action only. The action is enforced by the web server function 103 by configuring 320 the component of the SFP unit 100, using the configurations parameters present in the control command if any, and optionally generating additional configuration parameters. Examples of actions include enforcing an initial configuration of the SFP unit 100, modifying the present configuration of the SFP unit 100, falling back to a manufacturer configuration of the SFP unit 100, rebooting a component of the SFP unit 100, modifying characteristics of a data traffic received or transmitted by the SFP unit 100, requesting the SFP unit 100 to generate and transmit operational statistics, etc.

In a particular aspect, configuring a component of the SFP unit 100 based on the processing of the received control command 312 consists in configuring the control unit 102. For example, the control command 312 comprises the IP address of a device (e.g. the control device 200 or another device not represented in the Figures) to which the web server function 103 transmits diagnostic messages, as will be detailed later in the description. The configuration of the control unit 102 consists in storing the IP address in the memory 105 of the control unit 102. Additionally, the control command 312 may comprise a selection of operating parameters of the SFP unit 100 (among a plurality of available parameters) to be transmitted via the diagnostic messages, and optionally a frequency of transmission. The configuration of the control unit 102 consists in storing the parameters and the optional frequency of transmission in the memory 105 of the control unit 102. The control command 312 may also include an update of a software executed by the processing unit 104 of the control unit 102 (e.g. a firmware update), or a new software to be executed by the processing unit 104 for enhancing the control unit 102 with a new functionality provided by the new software. The configuration of the control unit 102 consists in storing the updated or new software in the memory 105 of the control unit 102, and updating the software configuration of the control unit 102. The software may be executed by the processing unit 104 within the web server function 103 (e.g. in the form of a script, such as a JavaScript, integrated to the web server function 103), or may be executed by the processing unit 104 independently of the web server function 103. The control command 312 may also include a specification of resources of the control unit 102 to be shared with other components of the SFP unit 100 (e.g. with the signal processing unit 108). For example, the control unit 102 may allocate a percentage of the processing power of its processing unit 104 for processing data treated by the signal processing unit 108 and/or may allocate a percentage of the memory space of its memory 105 for storing data treated by the signal processing unit 108. The configuration of the control unit 102 consists in allocating the specified resources to the other component of the SFP unit 100.

The configuration of the control unit 102 may be performed directly by the web server function 103, for example by the execution of dedicated configuration scripts. Alternatively or complementarity, the configuration of the control unit 102 may be performed via the execution of a dedicated configuration software by the processing unit 104, the execution being triggered (and controlled) by the web server function 103.

In another particular aspect, configuring a component of the SFP unit 100 based on the processing of the received control command 312 consists in configuring the signal processing unit 108. Processing the received control command 312 may include generating an internal control command 312' based on the processing of the received control command 312, and transmitting (via the input/output interface 106) the internal control command 312' from the control unit 102 to the signal processing unit 108 (e.g. via an internal communication bus of the SFP unit 100 not represented in the Figures). A processor (not represented in the Figures) of the signal processing unit 108 processes the received internal control command 312' and configures the signal processing unit 108 accordingly. For example, if the signal processing unit 108 comprises a re-clocking functionality, the control command 312 may comprise a re-clocking frequency and/or a tolerance margin for the re-clocked signal. The configuration of the signal processing unit 108 consists in configuring the re-clocking functionality for operating at the specified re-clocking frequency and/or with the specified tolerance margin. In another example, if the signal processing unit 108 comprises a Digital to Analog Converter (DAC) or Analog to Digital Converter (ADC), the control command 312 may comprise the frequency of a carrier signal generated by the ADC or the DAC. The configuration of the signal processing unit 108 consists in configuring the DAC or the ADC to generate a carrier signal with the specified frequency.

In another example, if the signal processing unit 108 comprises a video format conversion module for converting a video signal from a first format (e.g. standard definition television (SDTV) format) to a second format (e.g. enhanced definition television (EDTV) format or high definition television (HDTV) format), the control command 312 may comprise the first format and second video formats. The configuration of the signal processing unit 108 consists in configuring the video format conversion module to operate at the specified first and second video formats.

In another example, the control command 312 may comprise parameters and/or commands for controlling a data traffic received and/or transmitted by the signal processing unit 108 via a communication interface (e.g. 20, 21, or 17) of the SFP unit 100. Controlling the data traffic includes for example changing a direction of the data traffic, changing a destination port of the data traffic, changing a protocol used for carrying the data traffic, changing a data rate of the data traffic, changing a property of the data traffic (e.g. quality of service, error rate, encryption mode, etc.), etc.

Although not represented in the Figures, the SFP unit 100 may comprise several signal processing units 108, which can all be configured based on the processing of received control command(s) 312 by the web server function 103. Additionally, instead of using a dedicated control unit 102, the functionalities of the control unit 102 (in particular the web server function 103) may be combined with those of a signal processing unit 108, thus saving some precious space inside the housing 12.

The method 300 may further comprise the steps of generating 325 a diagnostic message 332 by the web server function 103 and transmitting 330 the diagnostic message 332 to the control device 200. The diagnostic message 332 may comprise a diagnostic of the control unit 102, a diagnostic of the signal processing unit(s) 108, or a combination thereof. The diagnostic message 332 may also comprise a diagnostic (performed by the control unit 102 and/or the processing unit(s) 108) of other components of the SFP unit 100, such as its communication interfaces (e.g. 20, 21, or 17). The diagnostic of a component generally includes statistics related to operational parameters of the component, but may include other information as illustrated in the following.

A signal processing unit 108 may generate an internal diagnostic message 332' comprising a diagnostic of its functionalities (as well as functionalities of other components), and transmit the internal diagnostic message 332' to the control unit 102 (e.g. via an internal communication bus of the SFP unit 100 not represented in the Figures). The internal diagnostic message 332' is received through the input/output unit 106 and processed by the web server function 103 to generate the diagnostic message 332 transmitted to the control device 200.

Examples of information transmitted via the diagnostic message 332 includes a percentage of utilization of a processor or a memory of the control unit 102 or signal processing unit(s) 108, a power received and/or a power used by a hardware component (e.g. 102 or 108) of the SFP unit 100, a voltage received by a hardware component (e.g. 102 or 108) of the SFP unit 100, a temperature of a hardware component (e.g. 102 or 108) of the SFP unit 100, an amount of data received or transmitted by a processing unit 108 via a connector (e.g. 17, 20 or 21), a link state of a connector (e.g. 17, 20 or 21), an error rate calculated on the data processed by a processing unit 108, an alert for a component (e.g. control unit 102, signal processing unit 108, connector 17, 20 or 21, etc.) of the SFP unit 100 not operating properly, a specific event associated to a specific component of the SFP unit 100, a debug information associated to a specific component of the SFP unit, a specific trigger associated to a specific component of the SFP unit, etc.

The web server function 103 may generate and transmit diagnostic messages 332 at pre-defined intervals (which can be configured via a control message 312 comprising configuration parameters of the diagnostic functionality), upon detection of a pre-defined operational condition of the SFP unit 100 requiring the transmission of a diagnostic message 332, or upon request from the control device 200 to transmit a diagnostic message 332. A diagnostic message 332 may include instant values of operational parameters of components of the SFP unit 100, statistics collected over a determined period of time of operational parameters of components of the SFP unit 100, or a combination of both.

The web server function 103 may implement only the control functionality (reception and processing of control messages 312), only the diagnostic functionality (generation and transmission of diagnostic messages 332), or a combination of the control and diagnostic functionalities. Furthermore, the web server function 103 may exchange data with several control devices 200 for implementing these functionalities. For example, the web server function 103 may exchange data with a first control device 200 for the control functionality and with a second diagnostic device 200 for the diagnostic functionality.

A single control device 200 may control a plurality of SFP units 100. Each SFP unit 100 under its control can be identified by a unique identifier or by its unique IP address.

In a particular embodiment, an SFP unit 100 may act as a control device 200 for other SFP units 100. For instance, the control SFP unit may receive diagnostic messages 332 from the other SFP units, process the diagnostic messages to determine appropriate actions to be taken (e.g. reconfiguration of a hardware or software component, modification of an operational parameter, etc.), and send control commands 312 to the other SFP units for enforcing the actions to be taken.

Figure 10:
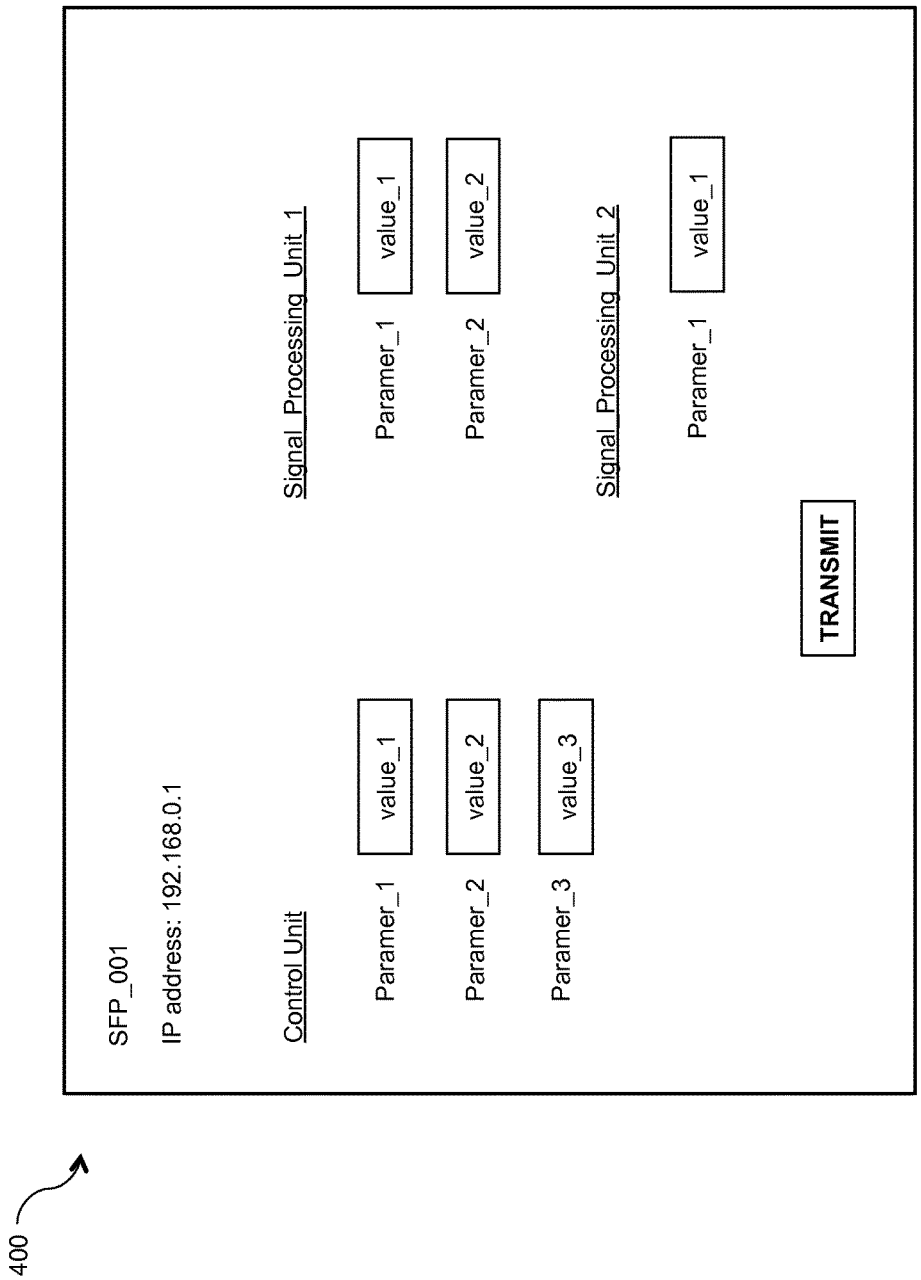
FIG. 10 illustrates an example of a configuration web page of the SFP unit of FIGS. 7A and 8 through the web server function.

Referring now concurrently to FIGS. 7A, 8 and 10, an exemplary configuration web page 400 for controlling the SFP unit 100 of FIGS. 7A and 8 is represented. For illustration purposes, we consider that the SFP unit 100 comprises a second signal processing unit not represented in FIGS. 7A and 8.

The configuration web page 400 has been transmitted to the control device 200 by the web server function 103 via an HTTP response to an HTTP request sent by the control device 200 to the web server function 103. The configuration web page 400 is displayed on the display of the control device 200 and can be modified by a user via the user interface of the control device 200.

The configuration web page 400 comprises an identifier (e.g. SFP_001) of and the current IP address (e.g. 192.168.0.1) of the SFP unit 100. The control unit 102 has three parameters (parameter_1, parameter_2 and parameter_3) which values can be configured via the configuration web page 400. The current values (value_1, value_2 and value_3) are displayed in an entry box and can be modified by the user of the control device 200. Similarly, the first signal processing unit 108 has two parameters, which current values can be modified by the user of the control device 200. The second signal processing unit (not represented in FIGS. 7A and 8) has one parameter, which current value can be modified by the user of the control device 200.

Once the user has finished updating the values of the parameters in the configuration web page 400, he can push a transmit button and the control device 200 generates the control command 312 with the updated values of the parameters. The control command 312 is then transmitted (in the form of an HTTP request with a POST method) from the configuration device 200 to the web server function 103.

In the interest of clarity, not all of the routine features of the implementations of the SFP units are shown and described. It will, of course, be appreciated that in the development of any such actual implementation of the SFP units, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of signal processing having the benefit of the present disclosure.

In accordance with the present disclosure, the components described herein may be implemented using various types of hardwired devices, field programmable gate arrays (FPGAs), application specific integrated circuits (ASICs), or the like.

Components and modules described herein may comprise software, firmware, hardware, or any combination(s) of software, firmware, or hardware suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
   a housing having specific standardized dimensions and adapted to being inserted into a chassis of a hosting unit;
   a rear interface on a back panel of the housing, the rear interface being adapted for connecting the transceiving unit to a backplane of the chassis of the hosting unit;
   at least two independent front connectors on a front panel of the housing capable of independently transmitting or receiving a signal; and
   a control unit in the housing executing a web server function for:
      hosting one or more web pages comprising at least one editable field, the at least one editable field corresponding to a configurable parameter of a configurable component of the transceiving unit;
      transmitting the one or more web pages to a control device via one of the following: the rear interface or one of the at least two front connectors, the value of the at least one editable field consisting of a current value of the configurable parameter of the configurable component;
      receiving a control command from the control device via one of the following: the rear interface or one of the at least two front connectors, the control command comprising an updated value of the configurable parameter of the configurable component; and
      configuring the configurable component of the transceiving unit based on the updated value of the configurable parameter of the configurable component received in the control command.

2. The standardized hot-pluggable transceiving unit of claim 1, wherein the configurable component of the transceiving unit consists of the control unit.

3. The standardized hot-pluggable transceiving unit of claim 1, wherein the housing further comprises a signal processing unit for processing a data traffic transported by a signal received by the transceiving unit, and the configurable component of the transceiving unit consists of the signal processing unit, the configuration of the signal processing unit comprising controlling the processing of the data traffic by the signal processing unit based on the updated value of the configurable parameter.

4. The standardized hot-pluggable transceiving unit of claim 1, wherein executing the web server function further comprises generating a diagnostic message and transmitting the diagnostic message to a control device via one of the following: the rear interface or one of the at least two front connectors.

5. The standardized hot-pluggable transceiving unit of claim 4, wherein the diagnostic message comprises at least one of the following: a diagnostic of the control unit or a diagnostic of a signal processing unit comprised in the housing.

6. The standardized hot-pluggable transceiving unit of claim 1, wherein the control unit generates a control command and transmits the generated control command to another standardized hot-pluggable transceiving unit.

7. A standardized hot-pluggable transceiving unit comprising:
   a housing having specific standardized dimensions and adapted to being inserted into a chassis of a hosting unit;
   a communication interface;
   a signal processing unit located in the housing and comprising a processor for processing a data traffic transported by a signal received by the transceiving unit; and
   a control unit located in the housing and comprising at least one other processor for executing a web server function for:
      hosting one or more web pages comprising at least one editable field, the at least one editable field corresponding to a configurable parameter of the signal processing unit;
      transmitting the one or more web pages to a control device via the communication interface, the value of the at least one editable field consisting of a current value of the configurable parameter of the signal processing unit;
      receiving a control command from the control device via the communication interface, the control command comprising an updated value of the configurable parameter of the signal processing unit; and
      configuring the signal processing unit based on the updated value of the configurable parameter of the signal processing unit received in the control command, the configuration of the signal processing unit comprising controlling the processing of the data traffic by the processor of the signal processing unit based on the updated value of the configurable parameter of the signal processing unit received in the control command.

8. The standardized hot-pluggable transceiving unit of claim 7, wherein controlling the processing of the data traffic by the processor of the signal processing unit based on the updated value of the configurable parameter of the signal processing unit received in the control command comprises at least one of the following: changing a direction of the data traffic, changing a destination port of the data traffic, changing a protocol used for carrying the data traffic, changing a data rate of the data traffic, changing a quality of service of the data traffic, and changing an encryption mode of the data traffic.

9. The standardized hot-pluggable transceiving unit of claim 7, wherein the signal processing unit comprises a video format converter module, and controlling the processing of the data traffic by the processor of the signal processing unit based on the updated value of the configurable parameter of the signal processing unit received in the control command comprises configuring the video format converter module to operate a conversion of the data traffic from a first video format to a second video format.

10. The standardized hot-pluggable transceiving unit of claim 7, wherein the communication interface is one of the following: a rear interface on a back panel of the housing, a connector on a front panel of the housing, or a wireless communication interface.

11. The standardized hot-pluggable transceiving unit of claim 7, wherein executing the web server function further comprises generating a diagnostic message and transmitting the diagnostic message to a control device via the communication interface.

12. The standardized hot-pluggable transceiving unit of claim 11, wherein the diagnostic message comprises at least one of the following: a diagnostic of the control unit or a diagnostic of the signal processing unit.

13. The standardized hot-pluggable transceiving unit of claim 7, wherein the control unit generates a control command and transmits the generated control command to another standardized hot-pluggable transceiving unit.

14. A standardized hot-pluggable transceiving unit comprising:
a housing having specific standardized dimensions and adapted to being inserted into a chassis of a hosting unit;
a communication interface;
a signal processing unit located in the housing for processing a data traffic transported by a signal received by the transceiving unit, the signal processing unit comprising a video format converter module; and
a control unit located in the housing for executing a web server function for:
hosting one or more web pages comprising at least one editable field, the at least one editable field corresponding to a configurable parameter of the signal processing unit;
transmitting the one or more web pages to a control device via the communication interface, the value of the at least one editable field consisting of a current value of the configurable parameter of the signal processing unit;
receiving a control command from the control device via the communication interface, the control command comprising an updated value of the configurable parameter of the signal processing unit; and
configuring the signal processing unit based on the updated value of the configurable parameter of the signal processing unit received in the control command, the configuration of the signal processing unit comprising controlling the processing of the data traffic by the signal processing unit based on the updated value of the configurable parameter of the signal processing unit received in the control command;
wherein controlling the processing of the data traffic by the signal processing unit based on the updated value of the configurable parameter of the signal processing unit received in the control command comprises configuring the video format converter module to operate a conversion of the data traffic from a first video format to a second video format.

15. The standardized hot-pluggable transceiving unit of claim 14, wherein controlling the processing of the data traffic by the signal processing unit based on the updated value of the configurable parameter of the signal processing unit received in the control command further comprises at least one of the following: changing a direction of the data traffic, changing a destination port of the data traffic, changing a protocol used for carrying the data traffic, changing a data rate of the data traffic, changing a quality of service of the data traffic, and changing an encryption mode of the data traffic.

16. The standardized hot-pluggable transceiving unit of claim 14, wherein the communication interface is one of the following: a rear interface on a back panel of the housing, a connector on a front panel of the housing, or a wireless communication interface.

17. The standardized hot-pluggable transceiving unit of claim 14, wherein executing the web server function further comprises generating a diagnostic message and transmitting the diagnostic message to a control device via the communication interface.

18. The standardized hot-pluggable transceiving unit of claim 17, wherein the diagnostic message comprises at least one of the following: a diagnostic of the control unit or a diagnostic of the signal processing unit.

19. The standardized hot-pluggable transceiving unit of claim 14, wherein the control unit generates a control command and transmits the generated control command to another standardized hot-pluggable transceiving unit.

* * * * *